(12) United States Patent
Fujishiro et al.

(10) Patent No.: US 7,391,488 B2
(45) Date of Patent: Jun. 24, 2008

(54) REFLECTION TYPE LIQUID CRYSTAL DISPLAY DEVICE

(75) Inventors: Fumihiko Fujishiro, Kanagawa (JP); Hironori Kikkawa, Kanagawa (JP); Michiaki Sakamoto, Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 0 days.

(21) Appl. No.: 10/447,060

(22) Filed: May 28, 2003

(65) Prior Publication Data

US 2003/0223023 A1    Dec. 4, 2003

(30) Foreign Application Priority Data

May 29, 2002    (JP) ............... 2002-155466

(51) Int. Cl.
*G02F 1/1335*    (2006.01)
(52) U.S. Cl. .............. 349/113; 349/106; 349/112
(58) Field of Classification Search .......... 349/113, 349/114, 63, 106, 112
See application file for complete search history.

(56) References Cited

U.S. PATENT DOCUMENTS 5,949,507 A * 9/1999 Shimada et al. ............ 349/113
6,888,678 B2 * 5/2005 Nishiyama et al. ......... 359/599
2002/0021385 A1  2/2002 Nakabayashi et al. ........ 349/65
2002/0097358 A1 * 7/2002 Ueki et al. .................. 349/113

FOREIGN PATENT DOCUMENTS

| JP | 59-15279 | 1/1984 |
| JP | 10-153777 | 6/1998 |
| JP | 11295750 | * 10/1999 |
| JP | 2001-337323 | 7/2001 |
| JP | 2002-8424 | 1/2002 |
| JP | 2002-71965 | 3/2002 |
| KR | 2000-0011672 | 2/2000 |
| KR | 2000-0059471 | 10/2000 |

* cited by examiner

*Primary Examiner*—Huyen Ngo
(74) *Attorney, Agent, or Firm*—Hayes Soloway P.C.

(57) ABSTRACT

In a reflection type liquid crystal display device having a front light and a reflection type liquid crystal panel including a reflection electrode of uneven structure, average tilt angles of the uneven structure of the reflection electrode are changed to form a high directivity reflective region having a characteristic reflecting an incident light from the front light in a vertical direction and a wide viewing angle reflective region having a characteristic reflecting an outside light incident slantingly from the front in a vertical direction, thereby forming the high directivity reflective region and the wide viewing angle reflective region to be mixed in the reflection electrode in the same display device.

26 Claims, 11 Drawing Sheets

| REFLECTIVE CHARACTERISTIC (AREA RATIO = WIDE VIEWING ANGLE : HIGH DIRECTIVITY) | BRIGHTNESS AT ILLUMINATING FL (cd/m$^2$) | BRIGHTNESS PERCENTAGE |
|---|---|---|
| HIGH DIRECTIVITY | 39.6 | (100%) |
| WIDE VIEWING ANGLE | 29.9 | 75.5% |
| AREA RATIO 5:5 | 37.5 | 94.7% |
| AREA RATIO 3:7 | 40.2 | 101.5% |
| AREA RATIO 1:9 | 44.5 | 112.4% |

Fig. 10
PRIOR ART
(OBSERVER'S SIDE)

REFLECTION TYPE LIQUID CRYSTAL DISPLAY DEVICE

BACKGROUND OF THE INVENTION

1. Field of the Invention

The present invention relates to a reflection type liquid crystal display device. More specifically, the present invention relates to a reflection type liquid crystal display device having a front light.

2. Description of the Related Art

Reflection type liquid crystal display devices are suitable for low power consumption since their back light need not be illuminated at all times. They are employed for cellular phones and portable information terminal devices so called PDA (Personal Digital Assistant).

The reflection type liquid crystal display devices use mainly a light from an outside light for display. In many cases, they have an auxiliary light source called a front light by assuming their use under an environment in which an outside light cannot be expected. The basic construction of a reflection type liquid crystal display device with a front light will be described below.

Figure 10:
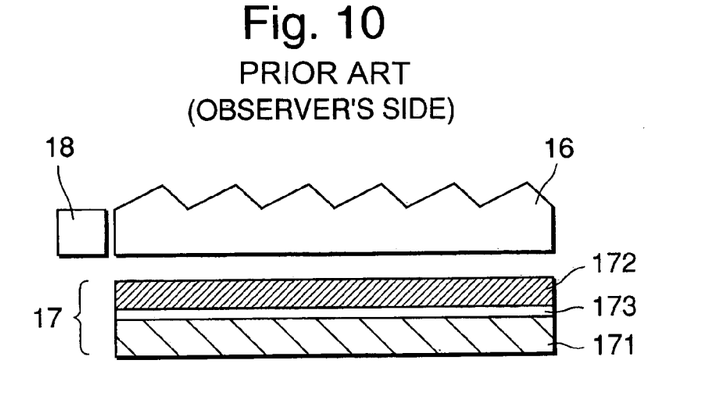
FIG. 10 is a cross-sectional view showing the construction of a reflection type liquid crystal panel, a reflector and a front light of a prior art.
Figure 11:
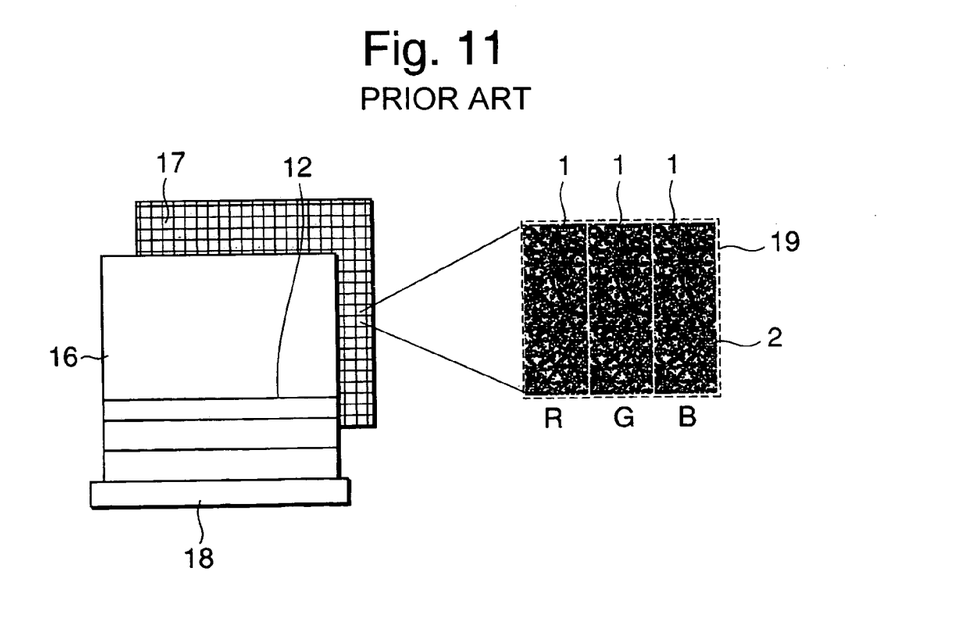
FIG. 11 is a plan view showing the construction of the reflection type liquid crystal panel, the reflector and the front light of the prior art.

FIG. 10 and FIG. 11 show the constructions of a reflection type liquid crystal panel and a front light of a prior art. A reflection type liquid crystal panel 17 has a liquid crystal layer 173 interposed between a pixel substrate 171 having a reflection pixel electrode and a color filter substrate 172.

As shown in FIG. 10, a front light 16 is arranged at the frontward side (observer's side) of the reflection type liquid crystal panel 17, and has a function of allowing a light from a light source part 18 to be incident onto the reflection type liquid crystal panel 17 to pass the light reflected in the inner part of the reflection type liquid crystal panel 17 through the observer's side.

As shown in FIG. 11, the reflection type liquid crystal panel 17 has a reflection electrode 1 of uneven structure for reflecting a light onto a TFT substrate, and forms one pixel 19 by three display devices 2 corresponding to red, green, and blue colors (R, G, and B) for color display. A method for forming a random uneven pattern in one display device 2 or one pixel 19 as a basic unit is typical.

Figure 12:
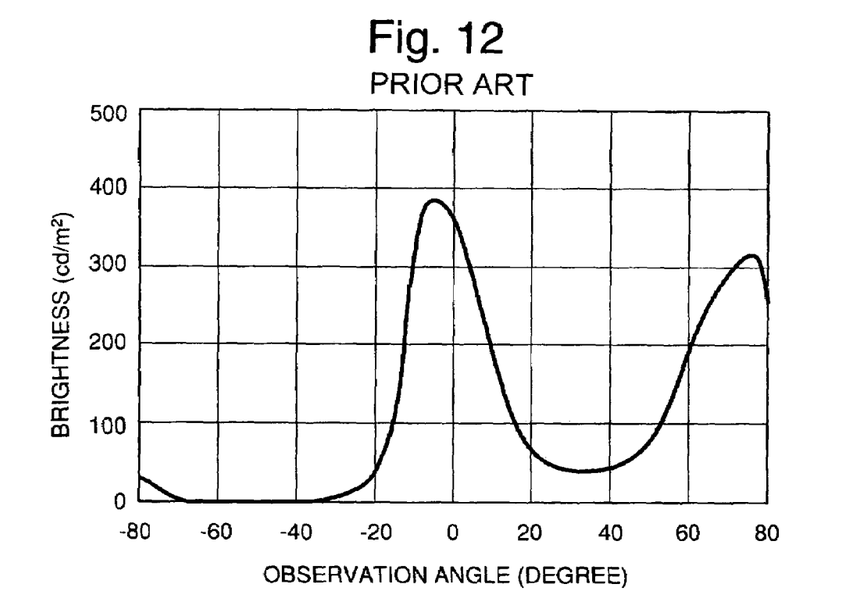
FIG. 12 is a diagram showing the emitted light characteristic of the front light of the prior art.

FIG. 12 is a diagram showing change in brightness of an emitted light from the front light 16 to observation angles. As seen from the drawing, to obtain bright display at illuminating the front light, the light is emitted in a direction almost vertical to the reflection type liquid crystal panel 17.

Figure 13A:
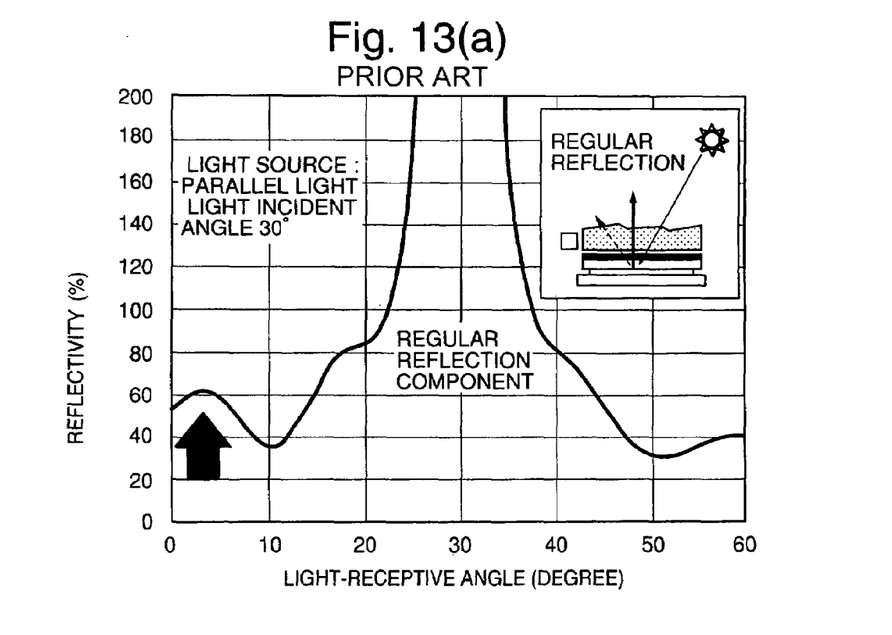
FIGS. 13(a) and 13(b) are diagrams showing the reflective characteristic of the reflector used in the reflection type liquid crystal display device of the prior art.
Figure 13B:
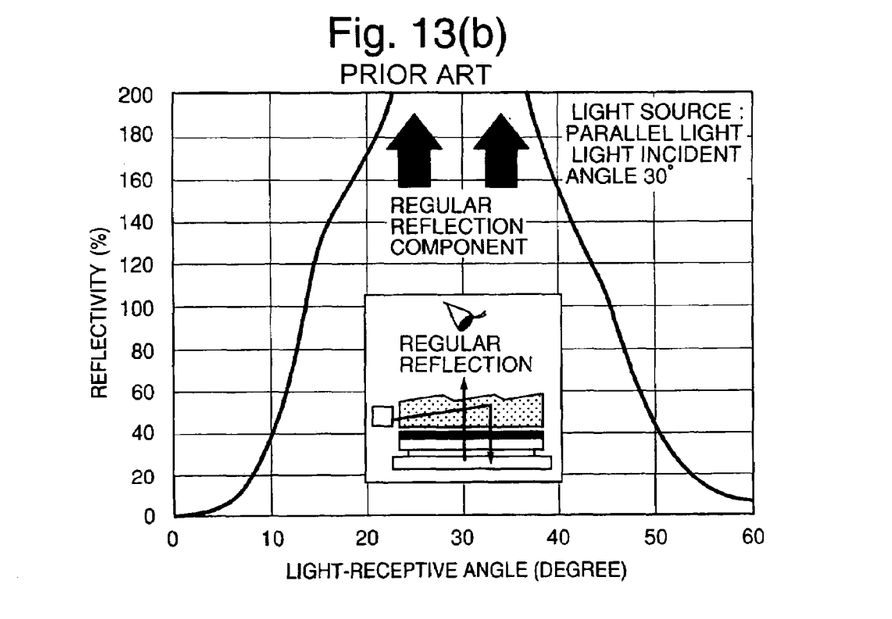

FIG. 13 shows the characteristic of a reflector of the prior art. It shows light-receptive angle dependence of reflectivity to a parallel incident light having an incident angle of 30°.

As shown in FIG. 13(a), the reflection type liquid crystal display device is often used outdoors. In this case, an outside light such as a sunlight or fluorescent lamp is used to see display of the liquid crystal panel.

The brightness is highest at the regular reflection position of the outside light. Since the image of the outside light is observed, the display of the liquid crystal panel is hard to see. The reflector of the prior art has been designed so as to obtain bright display at an angle shifted several tens of degrees from the regular reflection position (30°) of the outside light, as indicated by the arrow in FIG. 13(a).

In the reflection type liquid crystal panel having a front light, as shown in FIG. 13(b), such a reflector is proposed to emphasize the effective use of a light from the front light.

A white-color light-emitting diode is often employed as a substitute for a cold-cathode tube in view of low power consumption and low noise. Since the light-emitting diode has a smaller input power compared to that of the cold-cathode tube, it is hard to obtain a brightness higher than that of the cold-cathode tube.

Specifically, to obtain high brightness at illuminating the front light, the flat part of the reflector is increased to make a regular reflection component larger.

As a result, as shown in FIG. 13(b), bright display can be obtained at an angle near the regular reflection.

The prior art reflection type liquid crystal device having a front light, however, has a reflective characteristic in which a viewing angle is narrow although high brightness can be obtained at illuminating the front light. A bright display cannot be obtained with outside light when not illuminating the front light.

Light usage, in an optical system, is different for outside light than for a front light. Thus, a prior art reflection type liquid crystal device having a front light has difficulty obtaining a bright display under both the environments.

SUMMARY OF THE INVENTION

The present invention has been made under such technical background. An object of the present invention is to provide a reflection type liquid crystal display device which can obtain bright display under both environments such as outdoors in which an outside light is dominant and indoors or in a dark place needing to illuminate a front light.

To achieve the above object, in the present invention, a reflection type liquid crystal display device having a front light and a reflection type liquid crystal panel including a reflection electrode of uneven structure, wherein the same display device has two or more reflective regions in which average tilt angles of the uneven structure of the reflection electrode are different, and at least one of the reflective regions has a reflective characteristic reflecting an incident light from the front light in a vertical direction.

In the present invention, a reflection type liquid crystal display device having a front light and a reflection type liquid crystal panel including a reflection electrode of uneven structure, wherein the reflection electrode in the same display device has a reflective region having a wide viewing angle reflective characteristic and a reflective region having a high directivity reflective characteristic, and the reflective region having a high directivity reflective characteristic has a reflective characteristic reflecting an incident light from the front light in a vertical direction.

In the present invention, a reflection type liquid crystal display device having a front light and a reflection type liquid crystal panel including a reflection electrode of uneven structure, wherein the reflection electrode in the same display device has a reflective region having a wide viewing angle reflective characteristic and a reflective region having a high directivity reflective characteristic, and an average tilt angle of the uneven structure of the reflection electrode of the reflective region having a wide viewing angle reflective characteristic is in the range of 1.3 to 3 times an average tilt angle of the uneven structure of the reflection electrode of the reflective region having a high directivity reflective characteristic.

In the present invention, the area of the reflective region having a high directivity reflective characteristic of the reflection electrode is in the range of 1 to 4 times the area of the reflective region having a wide viewing angle reflective characteristic.

In the present invention, the boundary between the different reflective regions of the reflection electrode is formed in a steps shape.

In the present invention, in the reflection electrode in the same display device, the reflective region having a high directivity reflective characteristic is arranged above the reflection type liquid crystal panel as compared with the reflective region having a wide viewing angle reflective characteristic.

In the present invention, there are dividedly arranged a high transmissivity color filter in the region corresponding to the wide viewing angle reflective region of the reflection electrode, and a high chromaticity range color filter in the region corresponding to the high directivity reflective region thereof.

DETAILED DESCRIPTION OF THE PREFERRED EMBODIMENTS

Embodiments of the present invention will be described in detail with reference to the drawings.

Figure 1:
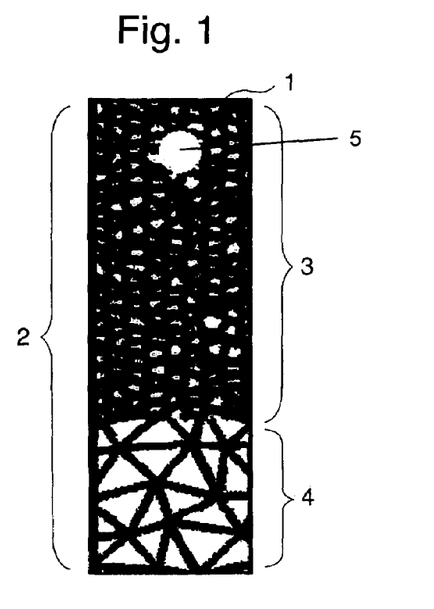
FIG. 1 is a plan view showing a structure of one display device of a reflector used in a reflection type liquid crystal display device according to an embodiment of the present invention.

FIG. 1 is a plan view showing a structure of one display device 2 of a reflection electrode 1 used in a reflection type liquid crystal display device according to an embodiment of the present invention. In the drawing, the black line indicates the convex part of the reflection electrode 1. The wider the black line part, the larger the flat part of the top part of the convex part so that an average tilt angle of the uneven shape becomes smaller.

After forming the uneven shape of the reflector, the average tilt angle is obtained by measuring a gap of the uneven shape of the surface using an atomic force microscope (AFM) to calculate a differential tilt angle from the result for averaging.

As shown in FIG. 1, in the design of the reflection electrode 1 used in the reflection type liquid crystal display device according to the embodiment of the present invention, one display device or one pixel as a basic unit of a random pattern of the reflection electrode is divided two or more regions, and then, a high directivity reflective region 3 and a wide viewing angle reflective region 4 are arranged at a predetermined area ratio.

The high directivity reflective region 3 refers to a region in which light regular reflection is dominant since an average tilt angle of the uneven structure of the reflection electrode 1 is small and a flat part is large.

The wide viewing angle reflective region 4 refers to a region in which an average tilt angle of the uneven structure of the reflection electrode 1 is large and light scattering is strong.

An average tilt angle of the uneven structure of the reflection electrode 1 needed for reflecting a reflected light onto the front surface of a liquid crystal panel, that is, in a vertical direction, to an incident angle of an incident light onto the liquid crystal display panel can be drawn from Snell's law in consideration of change in refractivity when the light is incident from air to the liquid crystal display panel.

When using a front light member, the emitted light distribution from the front light provides a narrow light of ±20° or less, as shown in FIG. 12 and is in the range of ±10 to ±20°. An average tilt angle of the uneven structure of the reflection electrode of the high directivity reflective region 3 needed for reflecting an incident light having the tilt onto the front surface of the liquid crystal display panel can be drawn as about 3.3 to about 5°.

When using an outside light, seeing display in a direction almost vertical to the liquid crystal display panel is preferred by a user. It is found that the user uses the device by tilting the liquid crystal display panel at an angle of about 20 to about 30° to an incident light from a light source to prevent the light source such as a sunlight or fluorescent lamp from entering the eyes.

When using the outside light, an average tilt angle of the uneven structure of the reflection electrode of the wide viewing angle reflective region 4 needed for reflecting an incident light onto the front surface of the liquid crystal display panel can be drawn as about 6.5 to about 9.5°.

From the above, when the average tilt angle of the wide viewing angle reflective region is in the range from about 1.3 times (6.5°:5.0°) to about 3 times (9.5°:3.3°) the average tilt angle of the high directivity reflective region, a bright, good display characteristic can be obtained under both the environments, i.e. using the front light and using the outside light.

In the embodiment of the present invention, an average tilt angle of the wide viewing angle reflective region is about 7.5°, and an average tilt angle of the high directivity reflective region is about 4°.

Adjustment of the average tilt angle is done by design of a mask pattern, exposure energy of a photoresist step (exposure of 80 mJ: actually, adjustment by exposure time), and sintering time (140° C.) of a photoresist pattern of an uneven shape.

Figure 2:
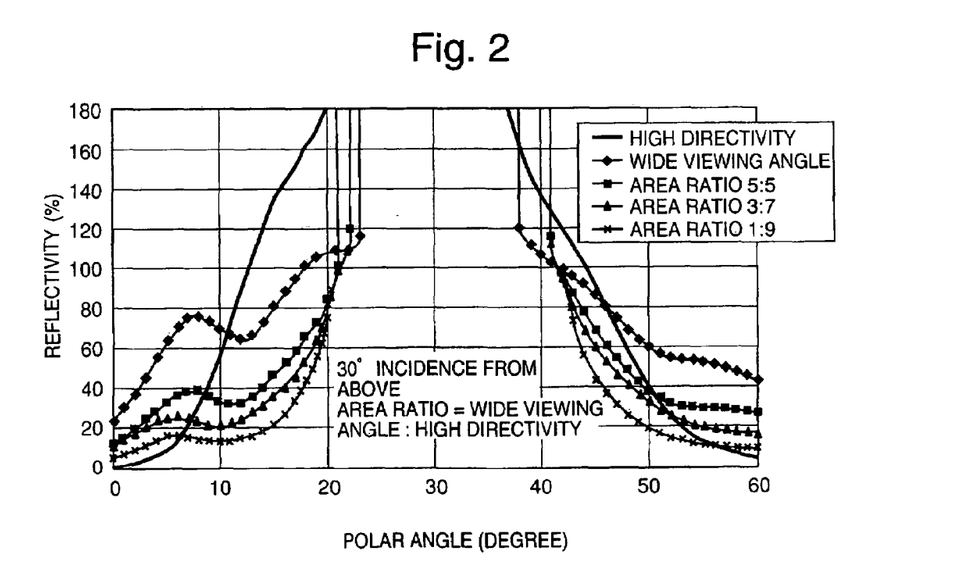
FIG. 2 is a diagram showing the reflective characteristic of the reflector used in the reflection type liquid crystal display device according to the embodiment of the present invention.

FIG. 2 shows the reflective characteristic of the reflection electrode of the reflection type liquid crystal display device according to the embodiment of the present invention. The drawing shows change in reflectivity of the area ratio of the wide viewing angle reflective region 4 to the high directivity reflective region 3 in one display device.

In FIG. 2, brightness observed in a position in which the polar angle is 0 to 20°, at 30° incidence from above, is dependent on the area of the wide viewing angle reflective region 4.

Figure 3:
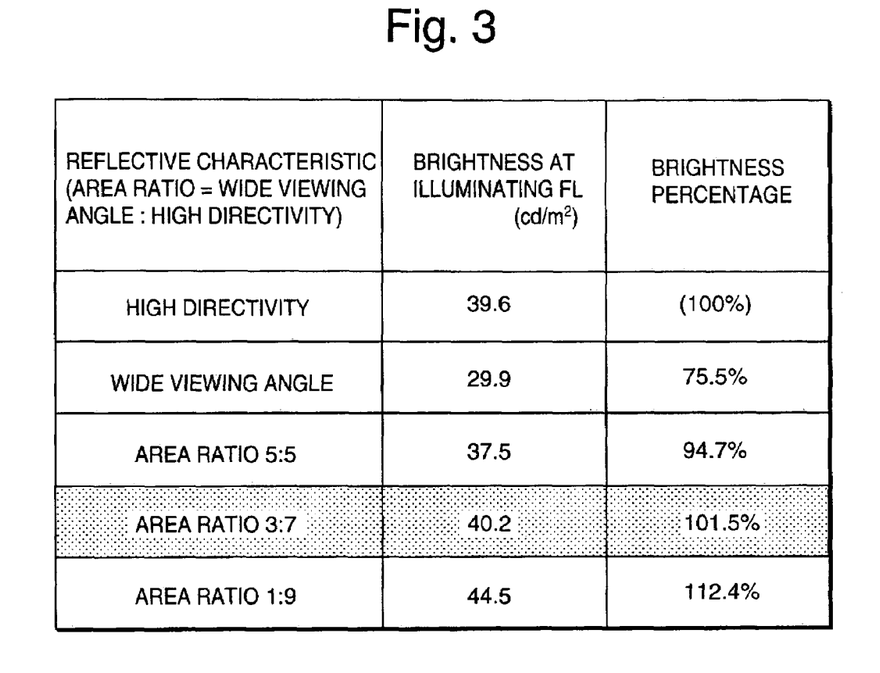
FIG. 3 is a diagram showing brightness at illuminating a front light of the reflector used in the reflection type liquid crystal display device according to the embodiment of the present invention.

In FIG. 3, a brightness at illuminating the front light (FL) is found to be dependent on the area of the high directivity reflective region 3. The area ratio is adjusted to enable adjustment of whether the brightness of the outside light or the brightness at illuminating the front light is emphasized.

In FIG. 3, when the area ratio of the wide viewing angle reflective region 4 to the high directivity reflective region 3 is 5:5, a brightness of about 95% can be obtained, as compared with the case that the entire surface is the high directivity reflective region 3.

When the area ratio of the wide viewing angle reflective region 4 to the high directivity reflective region 3 is above 2:8 and the area of the wide viewing angle reflective region 4 becomes smaller, it is difficult to form a reflection electrode having a good uneven shape, whereby a sufficient reflective characteristic cannot be obtained.

From the above, when the area of the high directivity reflective region 3 is in the range from about one time (area ratio 5:5) to about four times (area ratio 2:8) of the wide viewing angle reflective region 4, bright, good display characteristics can be obtained under both the environments, using the front light and using the outside light.

In the embodiment of the present invention, the area ratio of the wide viewing angle reflective region 4 to the high directivity reflective region 3 is about 3:7. It is thus set so that at illuminating the front light, a brightness equal to that of the case that the entire surface of the reflector 1 is the high directivity reflective region 3 can be obtained (FIG. 3). At the same time, as seen from FIG. 2, at a light-receptive angle of 0°, when the entire surface of the reflector is the high directivity reflective region 3, the reflectivity is nearly zero. In the embodiment of the present invention, a good reflective characteristic having a reflectivity above about 10% can be obtained.

As described above, in the embodiment of the present invention, the area ratio of the wide viewing angle reflective region 4 to the high directivity reflective region 3 is about 3:7. Good brightness characteristics can be obtained under both the environments, i.e. using the outside light and illuminating the front light.

A method for manufacturing reflective regions will be described.

An example of a method for manufacturing reflective regions having different reflective characteristics having an uneven shape is described in the specification of Japanese Patent Application Laid-Open No. 2001-337323. In the manufacturing method, the depth of the uneven shape is changed to adjust average tilt angles of the uneven shape to form reflective regions having different reflective characteristics.

In the manufacturing method, however, two different masks are necessary and an exposure step must be done twice. The manufacturing method is complicated, resulting in increase in the manufacturing cost.

The reflection type liquid crystal display device described in the publication is assumed to be used under the outside light. The case of using the front light is not described. It has a construction different from that of the reflection type liquid crystal display device having a front light according to the present invention.

FIG. 4 is a cross-sectional view of assistance in explaining a method for manufacturing reflective regions according to the embodiment of the present invention.

First, as shown in FIG. 4(*a*), an organic insulating film 7 is formed on the entire top surface of a TFT substrate 6 having a TFT region 5. As the organic insulating film 7, an acrylic photoresist can be used.

Next, as shown in FIG. 4(*b*), using masks 8 having a pattern corresponding to the wide viewing angle reflective region 4 and the high directivity reflective region 3 having a predetermined area ratio in the same display device or the same pixel, exposure and developing processing is conducted by a general photolithography method. An uneven structure 9 shown in FIG. 4(*c*) is formed.

Figure 4A:
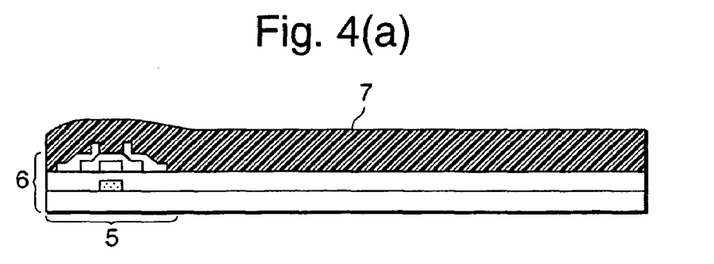
FIGS. 4(a) to 4(d) are cross-sectional views of the reflector of assistance in explaining a method for manufacturing reflective regions according to the embodiment of the present invention.
Figure 4B:
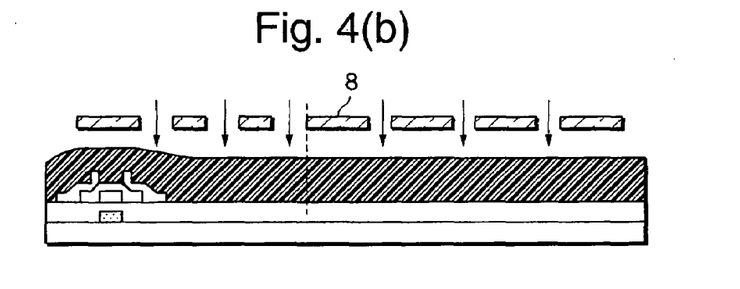
Figure 4C:
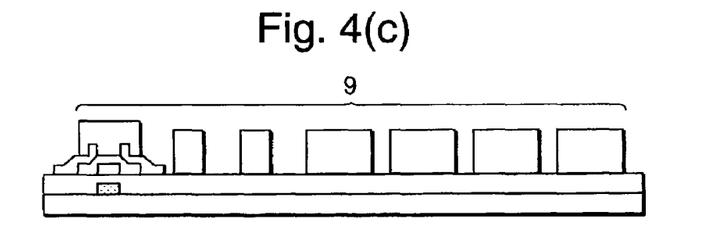
Figure 4D:
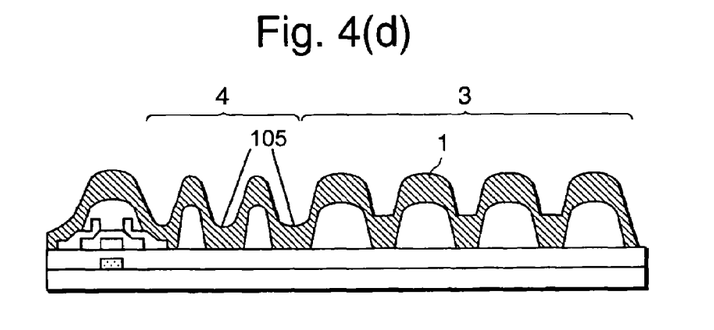

Thereafter, the convex part of the uneven structure 9 is melted by a heat treatment to be converted to have a smooth convex shape 105. As shown in FIG. 4(*d*), the high directivity reflective region 3 and the wide viewing angle reflective region 4 having different average tilt angles can be formed at the same time in one step.

Finally, metal such as aluminum is formed on the entire top surface of the uneven structure 9 to complete the reflection electrode 1 having an uneven shape.

With FIG. 5, an operating mechanism of the reflector used in the reflection type liquid crystal display device according to the embodiment of the present invention will be described.

Figure 5A:
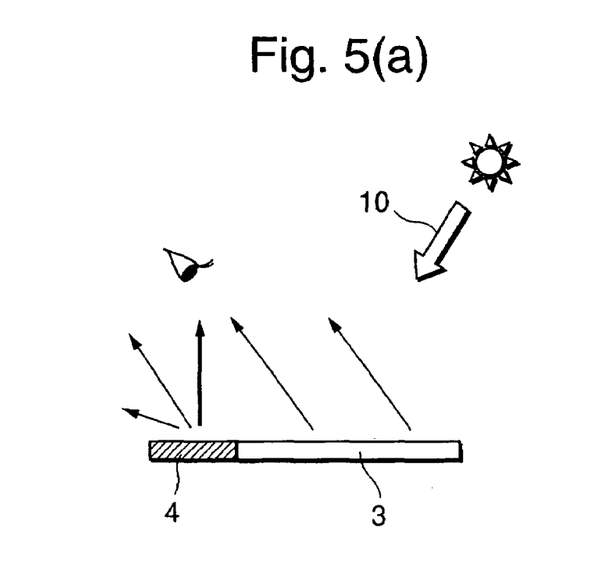
FIGS. 5(a) and 5(b) are diagrams of assistance in explaining an operating mechanism of the reflector used in the reflection type liquid crystal display device according to the embodiment of the present invention.

As shown in FIG. 5(*a*), to an outside light 10, the characteristic of the wide viewing angle reflective region 4 can obtain bright display at an angle shifted from an angle of the regular reflection. In the case of a relatively spot-like point light source such as a sunlight Image Page 3 or fluorescent lamp, the effect of the wide viewing angle reflective region 4 having strong diffusion can obtain bright display at the position shifted several degrees from the regular reflection.

Figure 5B:
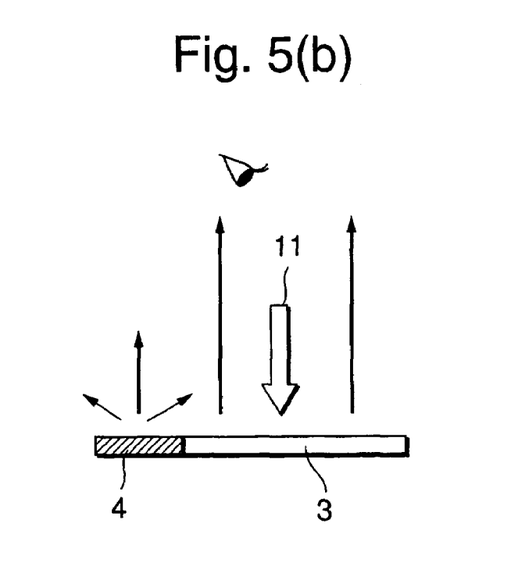

As shown in FIG. 5(*b*), at illuminating the front light, the characteristic of the high directivity reflective region 3 is dominant to obtain high brightness. To a surface light source irradiating a light in a direction almost vertical to the liquid crystal panel like the front light, contribution of the regular reflection component of a light 11 from the front light of the high directivity reflective region 3 can obtain a bright display. The front light can be illuminated by the user by the degree of an ambient light or can be automatically illuminated.

The light 11 from the front light is effectively used for display so as to obtain bright display without increasing a light output from the front light. The request of low power consumption in the reflection type liquid crystal display device can be met.

As described above, the reflection type liquid crystal display device according to the embodiment of the present invention has the wide viewing angle reflective region 4 and the high directivity reflective region 3 in one display device of the reflector. Bright display can be obtained under both the embodiments such as outdoors in which the outside light is dominant and indoors or in a dark place needing to illuminate the front light.

In the prior art reflection type liquid crystal display device, the front light and the reflection type liquid crystal panel are often arranged by the construction as shown in FIG. 11.

In this case, the boundary between the wide viewing angle reflective region 4 and the high directivity reflective region 3 of the reflection electrode is arranged to be parallel to one side of the display device, as shown in FIG. 1. The direction of a prism groove 12 of the front light and the boundary between the reflective regions are in the same direction to cause moiré by interference.

Figure 6:
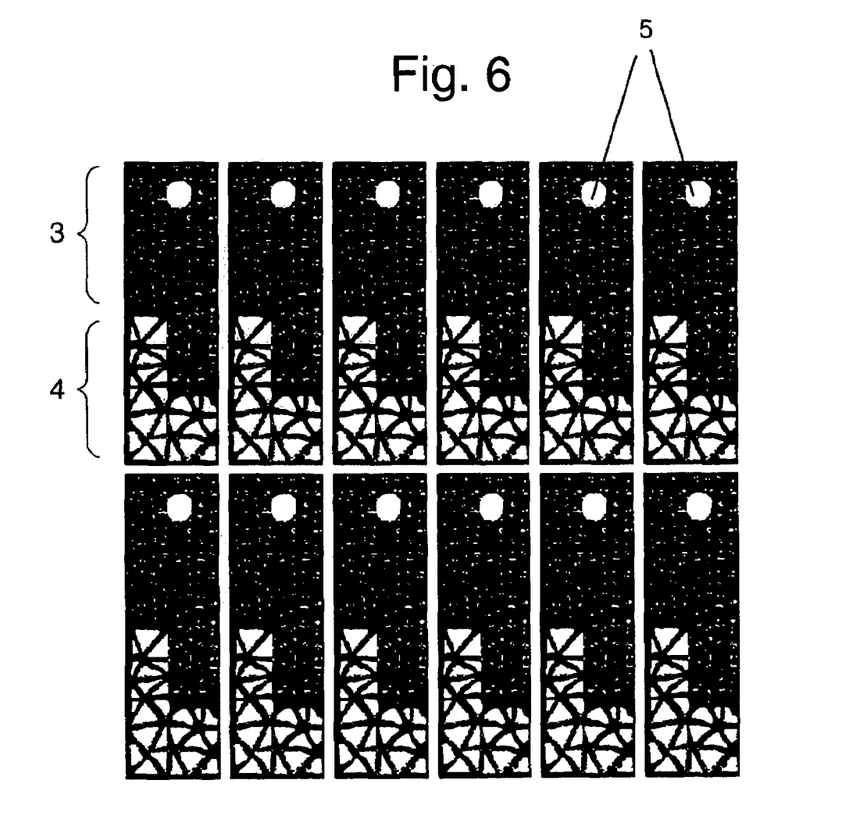
FIG. 6 is a plan view showing structures of the reflectors used in the reflection type liquid crystal display device according to the embodiment of the present invention.

As shown in FIG. 6, the boundary between the wide viewing angle reflective region 4 and the high directivity reflective region 3 is arranged to be of an L-formed steps shape. Interference of it with the linear prism groove 12 of the front light can be avoided to reduce occurrence of moiré.

Figure 7A:
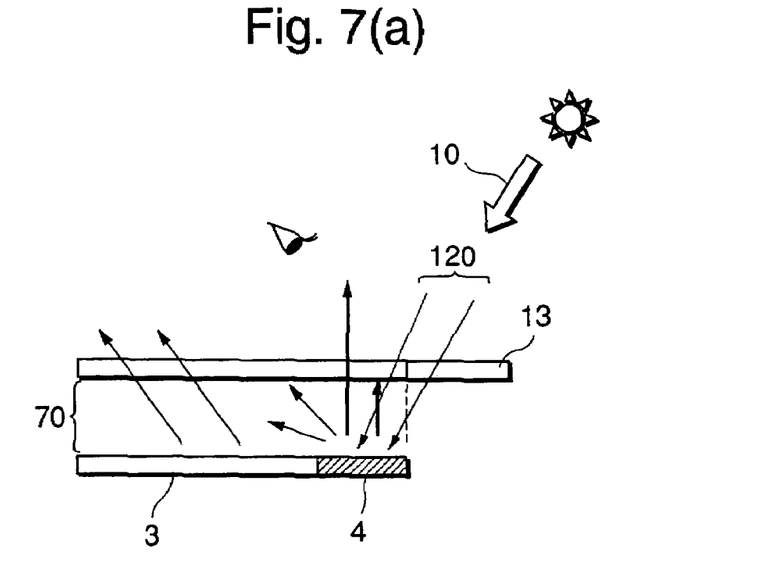
FIGS. 7(a) and 7(b) are diagrams of assistance in explaining a second operating mechanism of the reflector used in the reflection type liquid crystal display device according to the embodiment of the present invention.
Figure 7B:
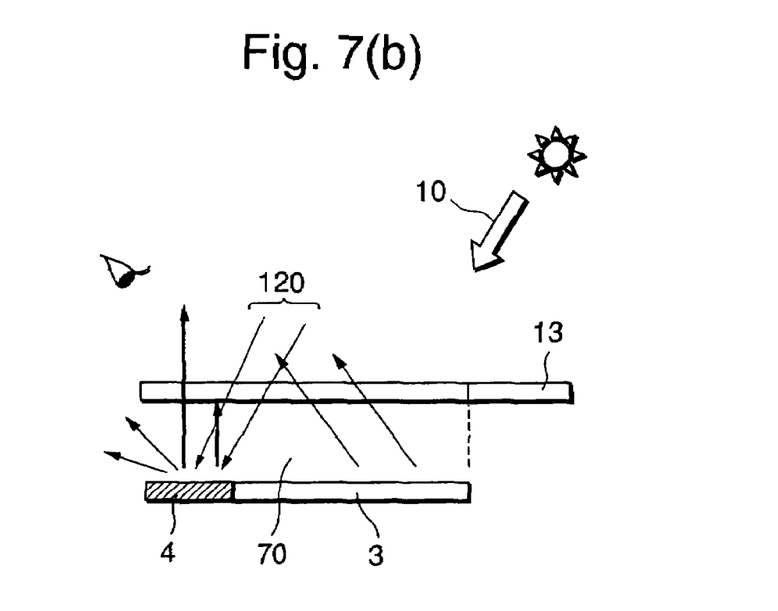

FIG. 7 is a diagram of assistance in explaining a second operating mechanism of the reflection electrode used in the reflection type liquid crystal display device according to the embodiment of the present invention.

When the front light is not illuminated to use the reflection type liquid crystal display device under the outside light 10, the outside light 10 generally exists above the user, that is, at the upper side of the display surface, as shown in FIG. 7.

As shown in FIG. 7(a), when the wide viewing angle reflective region 4 is arranged above the liquid crystal display panel, as compared with the high directivity reflective region 3. In the same display device, a light taking an optical path 120 incident onto the liquid crystal display panel passes through a color filter 13 corresponding to the adjacent pixel. The reference number 70 in the drawing denotes a liquid crystal layer.

When the adjacent color filter is a different color (R, G, and B), a light taking the optical path cannot pass through the color filter 13 on the original device. As a result, the brightness of the liquid crystal display panel is lowered under the outside light.

As shown in FIG. 7(b), the wide viewing angle reflective region 4 is arranged below the liquid crystal display panel, that is, at the lower side of the display surface, as compared with the high directivity reflective region 3, in the same display device. The light taking an optical path shown in 120 of FIG. 7(b) can pass through the color filter 13 corresponding to the same display device. The above influence can be avoided.

Figure 8:
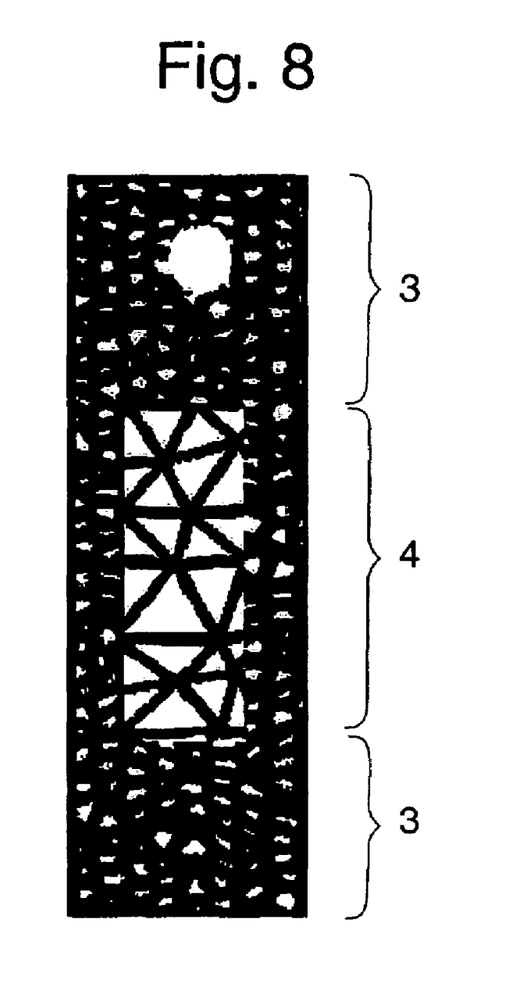
FIG. 8 is a plan view showing a second structure of one display device of the reflector used in the reflection type liquid crystal display device according to the embodiment of the present invention.

As shown in FIG. 8, the wide viewing angle reflective region 4 is arranged in the center of the display device 2 to obtain the same effect.

Figure 9A:
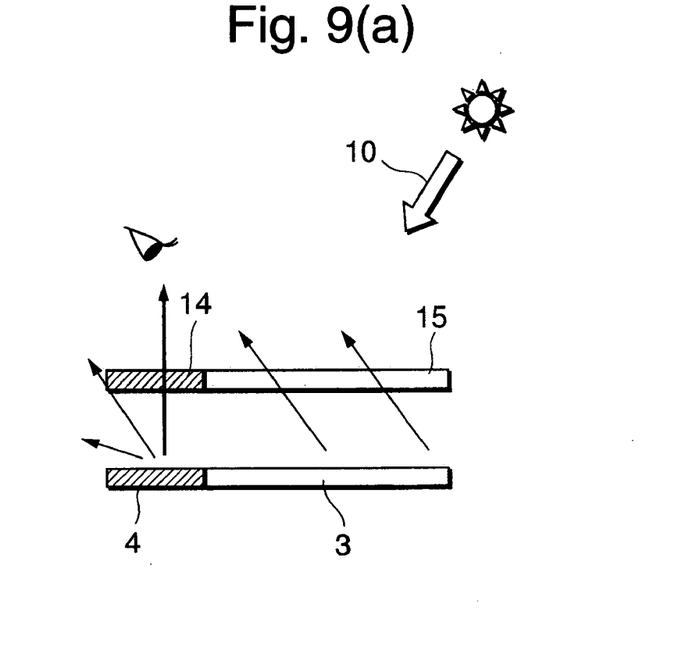
FIGS. 9(a) and 9(b) are diagrams of assistance in explaining an operating mechanism of a reflector according to a second embodiment of the present invention.
Figure 9B:
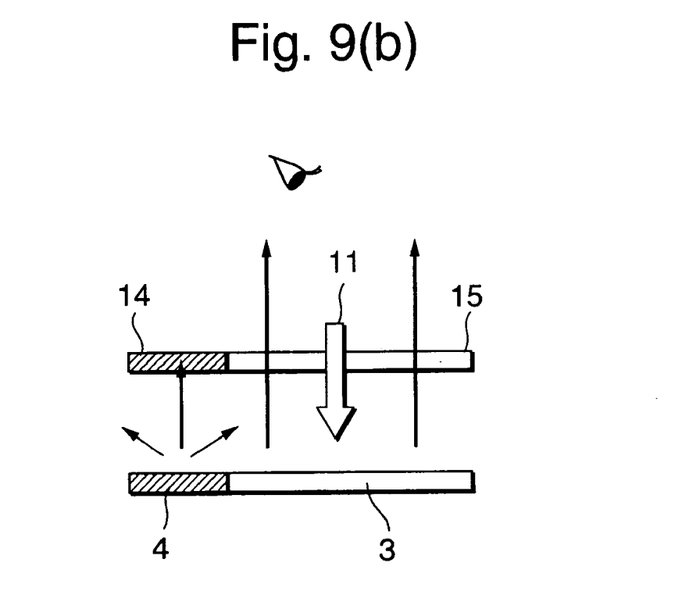

FIG. 9 is a diagram of assistance in explaining a second embodiment according to the present invention.

In the reflection type liquid crystal display device, the outside light 10 and the light 11 from the front light both pass through the same color filter twice. The white-color light-emitting diode used as a light source of the front light is deteriorated in color rendering as compared with the outside light such as a sunlight or fluorescent lamp. In addition, it cannot completely prevent interface reflection in the boundary between a light guide plates, air and the surface of the liquid crystal display panel. From such reasons, color reproducibility is deteriorated as compared with display using outside light.

To improve the color reproducibility when illuminating the front light, it is effective to prevent interface reflection and to increase the color density of the color filter. When increasing the color density of the entire color filter, the transmissivity of the color filter is lowered. The reflectivity of the reflection type liquid crystal panel at not illuminating the front light is lowered.

According to the second embodiment of the present invention, as shown in FIG. 9, there are dividedly arranged a high transmissivity color filter in the region corresponding to the wide viewing angle reflective region 4 of the reflection electrode, and a high chromaticity range color filter in the region corresponding to the high directivity reflective region 3. The color filters corresponding to the reflective characteristics of the reflector are thus arranged to obtain optimal brightness and color reproducibility under the respective environments.

Under the outside light 10 at not illuminating the front light, as shown in FIG. 9(a), the reflective characteristic having strong scattering of the wide viewing angle reflective region 4 can obtain bright display at the position in a direction almost vertical to the liquid crystal display panel shifted from the regular reflection. At this time, a high transmissivity color filter 14 is arranged immediately above the wide viewing angle reflective region 4 to obtain bright display.

When the front light is illuminated for use, as shown in FIG. 9(b), the light reflected by the high directivity reflective region 3 passes through a high chromaticity range color filter 15 to obtain display excellent in color reproducibility.

Specifically, there are used the high transmissivity color filter 14 having a chromaticity range of about 20% by twice passage, and the high chromaticity range color filter 15 having a chromaticity range of about 40% by twice passage. At using the outside light and at illuminating the front light, the same degree chromaticity range (about 20%) can be obtained. As in this example, in the relation between the high transmissivity color filter 14 and the high chromaticity range color filter 15, one is higher and the other is lower in the transmissivity and chromaticity range.

As described above, according to the present invention, there can be obtained the reflection type liquid crystal display device which permits sufficiently bright display excellent in color reproducibility under both the embodiments such as outdoors in which the outside light is dominant and indoors or a dark place needing to illuminate the front light.

What is claimed is:

1. A reflection type liquid crystal display device comprising:
a first substrate having a plurality of reflection pixel electrodes, said reflection pixel electrodes each having at least two reflective regions, said reflective regions having different uneven surface structures with different average tilt angles;
a second substrate arranged opposite said first substrate;
a liquid crystal interposed between said first substrate and said second substrate; and
a front light member arranged at said second substrate side,
wherein a first average tilt angle of one of said reflective regions is different from a second average tilt angle of the other of said reflective regions and,
wherein each of said average tilt angles is obtained by measuring a gap of the uneven surface structures of said reflective regions.

2. The reflection type liquid crystal display device according to claim 1, wherein said first average tilt angle is in a range of 1.3 to 3 times said second average tilt angle.

3. The reflection type liquid crystal display device according to claim 1, wherein an area of a first reflective region of said reflective regions is in a range of 1 to 4 times an area of a second reflective region of said reflective regions.

4. The reflection type liquid crystal display device according to claim 1, wherein a boundary between the reflective regions in said plurality of said reflection pixel electrodes is formed in an L-shaped step shape.

5. The reflection type liquid crystal display device according to claim 1, wherein a first reflective region is arranged at an upper side of a surface of the display as compared with a remainder of said reflective regions.

6. The reflection type liquid crystal display device according to claim 1,
wherein at least one of said reflective regions has a first reflective characteristic region reflecting an incident light from said front light member, the incident light reflected in a direction perpendicular to a surface of said first substrate.

7. A reflection type liquid crystal display device comprising:
a first substrate having a plurality of reflection pixel electrodes, said reflection pixel electrodes each having at least two reflective regions having different uneven surface structures, wherein at least one of the reflective regions is a wide viewing angle reflective region with strong light scattering and at least one of the reflective regions is a high directivity reflective region with a small average tilt angle, a second substrate arranged opposite said first substrate;

a liquid crystal interposed between said first substrate and said second substrate; and a front light member arranged at said second substrate side, wherein said small average tilt angle of said high directivity reflective region is smaller than a larger average tilt angle of said wide viewing angle reflective region.

8. The reflection type liquid crystal display device according to claim 7, wherein said larger average tilt angle is in a range of 1.3 to 3 times larger than said smaller average tilt angle of said high directivity reflective region.

9. The reflection type liquid crystal display device according to claim 7, wherein said larger average tilt angle is between approximately 6.5 degrees and approximately 9.5 degrees.

10. The reflection type liquid crystal display device according to claim 7, wherein said smaller average tilt angle is between approximately 3.3 degrees and approximately 5 degrees.

11. The reflection type liquid crystal display device according to claim 7, wherein an area of said high directivity reflective region is in a range of 1 to 4 times an area of said wide viewing angle reflective region.

12. The reflection type liquid crystal display device according to claim 7, wherein a boundary between the wide viewing angle reflective region and the high directivity reflective region in said reflection pixel electrode is formed in an L-shaped step shape.

13. The reflection type liquid crystal display device according to claim 7, wherein said wide viewing angle reflective region is arranged at an upper side of a surface of the display as compared with said high directivity reflective region.

14. A reflection type liquid crystal display device comprising:

a first substrate having a plurality of reflection pixel electrodes, said reflection pixel electrodes each having at least two reflective regions, said reflective regions having different uneven surface structures with different average tilt angles;

a second substrate arranged opposite said first substrate;

a liquid crystal interposed between said first substrate and said second substrate; and a front light member arranged at said second substrate side, wherein a first average tilt angle of one of said reflective regions is different from a second average tilt angle of the other of said reflective regions, wherein each of said average tilt angles is obtained by measuring a gap of the uneven surface structures of said reflective regions and, wherein said second substrate is formed with a first color filter corresponding to a first reflective region and a second color filter corresponding to a second reflective region, said first color filter has a chromaticity range higher than that of said second color filter, and said second color filter has a transmissivity higher than that of said first color filter.

15. A reflection type liquid crystal display device comprising:

a first substrate having a plurality of reflection pixel electrodes, said reflection pixel electrodes each having at least two reflective regions having different uneven surface structures, wherein at least one of the reflective regions is a wide viewing angle reflective region with strong light scattering and at least one of the reflective regions is a high directivity reflective region with a small average tilt angle, a second substrate arranged opposite said first substrate;

a liquid crystal interposed between said first substrate and said second substrate; and a front light member arranged at said second substrate side, wherein said small average tilt angle of said high directivity reflective region is smaller than a larger average tilt angle of said wide viewing angle reflective region and, wherein said second substrate is formed with a first color filter corresponding to said wide viewing angle reflective region and a second color filter corresponding to said high directivity reflective region, said second color filter has a chromaticity range higher than that of said first color filter, and said first color filter has a transmissivity higher than that of said second color filter.

16. The reflection type liquid crystal display device according to claim 15, wherein said first average tilt angle is in a range of 1.3 to 3 times said second average tilt angle.

17. The reflection type liquid crystal display device according to claim 16, wherein said larger average tilt angle is in a range of 1.3 to 3 times larger than said smaller average tilt angle of said high directivity reflective region.

18. The reflection type liquid crystal display device according to claim 16, wherein said larger average tilt angle is between approximately 6.5 degrees and approximately 9.5 degrees.

19. The reflection type liquid crystal display device according to claim 16, wherein said smaller average tilt angle is between approximately 3.3 degrees and approximately 5 degrees.

20. The reflection type liquid crystal display device according to claim 16, wherein an area of said high directivity reflective region is in a range of 1 to 4 times an area of said wide viewing angle reflective region.

21. The reflection type liquid crystal display device according to claim 16, wherein a boundary between the wide viewing angle reflective region and the high directivity reflective region in said reflection pixel electrode is formed in an L-shaped step shape.

22. The reflection type liquid crystal display device according to claim 16, wherein said wide viewing angle reflective region is arranged at an upper side of a surface of the display as compared with said high directivity reflective region.

23. The reflection type liquid crystal display device according to claim 15, wherein an area of a first reflective region of said reflective regions is in a range of 1 to 4 times an area of a second reflective region of said reflective regions.

24. The reflection type liquid crystal display device according to claim 15, wherein a boundary between the reflective regions in said plurality of said reflection pixel electrodes is formed in a step shape.

25. The reflection type liquid crystal display device according to claim 15, wherein a first reflective region is arranged at an upper side of a surface of the display as compared with a remainder of said reflective regions.

26. The reflection type liquid crystal display device according to claim 15, wherein at least one of said reflective regions has a first reflective characteristic region reflecting an incident light from said front light member, the incident light reflected in a direction perpendicular to a surface of said first substrate.

* * * * *